Figure 1:
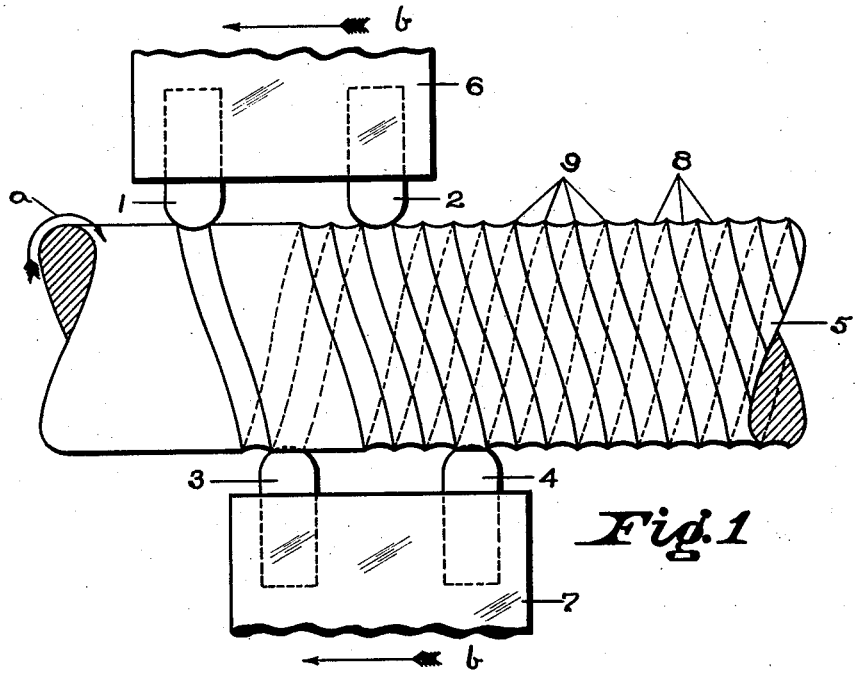

March 6, 1934.  C. H. NORTON  1,949,515

METHOD OF TURNING AND GRINDING ROUND WORK SURFACES

Original Filed Feb. 28, 1930

WITNESS
Edward H. Goodrich

Inventor
CHARLES H. NORTON
By Clayton L. Jenks
Attorney

Patented Mar. 6, 1934

1,949,515

UNITED STATES PATENT OFFICE 1,949,515

METHOD OF TURNING AND GRINDING ROUND WORK SURFACES

Charles H. Norton, Plainville, Conn., assignor to Norton Company, Worcester, Mass., a corporation of Massachusetts Original application February 28, 1930, Serial No. 432,224. Divided and this application April 23, 1931, Serial No. 532,289

6 Claims. (Cl. 29—148)

This invention relates to a novel method of removing stock from rotating work and finishing it at an extremely rapid rate.

The modern improvements in the art of removing stock from cylindrical or flat surfaced bodies by a lathe turning operation have not resulted in any appreciable changes from the old and well known methods of turning which have been common practice for many years, but have simply involved the use of better materials in the cutting tools themselves. Heretofore, the method of stock removal in a lathe turning operation has been to traverse the cutting tool along the work very slowly and take a heavy deep cut in the surface of a slowly revolving work piece. Owing to the extreme hardness of many materials that have to be subjected to a lathe turning operation, an extensive search has been made to find sharper and better cutting tools capable of withstanding a rapid heavy cutting operation and consequently there has been recently developed a lathe tool made of tungsten carbide granules cemented together by cobalt. A lathe tool made up of this material is very hard, fragile and so brittle as to be incapable of withstanding very heavy pressures. Furthermore, if the heat caused by the friction of the tool against the work during a turning operation becomes too high, there is a tendency for the metal being cut to fuse onto the nose of the cutting tool and thereby impair the efficiency of the tool. Due to the present day demands for rapid mass production, machine tool designers and machine operators have been endeavoring to utilize the maximum capabilities of such a lathe tool by removing the greatest possible amount of metal from a work piece in a single heavy hogging cut, and having neglected to appreciate the fact that such a tool should be utilized to remove a maximum amount of stock from the work in a given unit of time.

It is a well known fact that this new tool formed of tungsten carbide is superior to the old tool materials since it is capable of a much greater cutting speed, by which is meant the greatest possible speed at which the tool may be fed into the work without injuring or materially shortening the life of the cutting edge or nose of the tool. Tungsten carbide tool noses are frail and brittle, hence when they are utilized to take a deeper cut they must do so at a reduced speed since not only the strength of the tool nose is involved but also that portion of the tool which is held against the work under heavy pressure tends to create high temperatures and fuse the work material upon the tool nose thus impending the cutting action. Hence the prior users, in their appreciation that the tungsten carbide tools were capable of taking a faster cutting speed, have endeavored to determine just how deep a cut could be taken without injuring such a tool while cutting at higher speeds within the capacity of the lathe as heretofore developed. In other words, they have endeavored to find the greatest pressures within the capacity of the tool at a high cutting speed.

I have found that it is not efficient to attempt to cut a smooth finished surface with a lathe tool, since the necessity for having the cutting paths overlap requires a very slow rate of tool traverse along the work, thus increasing the length of time required to pass the tool over the work. Furthermore, the present day demands for precision workmanship on rotating parts are so great that even the smoothest finish formerly obtained by the most careful lathe turning and polishing methods is insufficient to meet the exacting requirements of much of our modern high speed machinery. A grinding wheel is very efficient in removing material from a rough surface, and it is not necessary to produce a smooth finished surface in the lathe prior to the grinding operation, since the rapidly rotating wheel can remove the roughness of the work surface in a fraction of the time required by a lathe tool when traversed slowly to produce a smooth finished surface.

One object of my invention is therefore to provide a novel method for rapidly producing round bodies which will insure a removal of a maximum amount of stock within a given time and utilize the new frail but hard cutting tools at their maximum efficiency for a long life of useful service, thereby reducing the expense of the finishing operation.

It is a further object of my invention to improve the method of producing round bodies by combining a lathe cutting operation with a grinding operation and having each serve only for that part of the entire machining operation which it can accomplish the most efficiently.

In accordance with my invention I propose to utilize a plurality of spaced high speed lathe tools for turning a piece of work and to limit the tool pressures upon the work so as to take light shallow cuts, while employing a high cutting speed, and preferably the highest within the capacity of the cutting edges of the tools. To this end, the work rotation and the relative reciprocation between the tools and work are rapid and so coordinated and the tools are so arranged as to supplement each other that a series of closely adjacent shallow non-overlapping cuts separated by ridges or projections of uncut material are produced and the full cutting capacity of each tool is utilized. When the work has been reduced to nearly the desired size, as represented by the bottoms of the cuts, then, and without first attempting to smooth the work surface by means of the lathe tools, I finish the operation by progressively grinding the projections away and reducing the work size until the wheel has ground below the botoms of the cuts and the desired size and finish of a cylindrical surface are attained.

One method of accomplishing my rapid stock removal and finishing operation has been illustrated in the accompanying drawing wherein like reference numerals indicate like parts.

Figure 2:
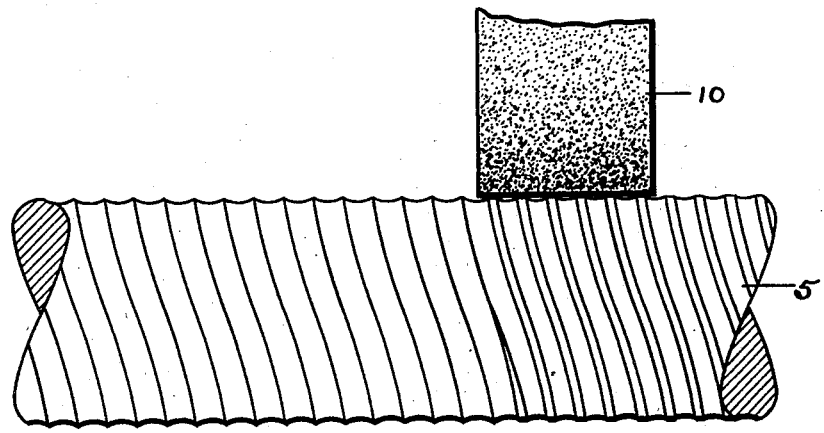

In the drawing:

Fig. 1 is a diagrammatic view illustrating my lathe turning method and is supplemented by Fig. 2 which is a diagrammatic showing of a grinding operation to rapidly reduce the rough turned work to exact size and finish.

I have found that my lathe turning method of stock removal by simultaneously taking a series of adjacent cuts under a light pressure at a rapid rate more nearly approaches the conditions met in the operation of a precision grinding machine wherein an infinite number of tiny abrasive particles in the grinding wheel simultaneously engage the work and cut successive minute paths therein, each particle doing only a small amount of work by itself, but the total work done by all of these particles in a given time representing a considerable sum. In accordance with my method, the modern lathe tools, which may contain material comparable with the abrasive grains of a grinding wheel, are utilized to simultaneously take a multiplicity of light shallow cuts in the work surface at a high circumferential speed and a rapid traverse. In this way by taking light, rapid cuts, I keep the fragile abrasive material within the cutting tool from becoming crushed or injured during the cutting action and thus enable it to maintain a sharp cutting edge for the maximum time.

Heretofore, it has been the common practice in most lathe turning operations to present the lathe tool in cutting engagement with a rotating work piece only while traversing in one direction, thus requiring a slow inoperative return stroke of the cutting tool and making such a turning method expensive and slow. It has also been common practice in many turning operations to present the tools to the work only from one side of the work which has tended to spring the work pieces especially when turning long and slender work causing an uneven pressure of the tool upon the work as it moves therealong and creating sufficient inaccuracies to often spoil the work pieces. This condition has often made it necessary to take a much lighter cut at a slower rate of turning and has thus rendered the turning operation even more expensive and inefficient since the cutting tool could not be utilized to its full operative capacity.

In accordance with my method for rapidly removing stock from a rotating work piece, I propose to use many tools and to locate each one of the cutting tools in full and operative contact with the work while it is traversing longitudinally thereof. I also prefer to so locate the lathe tools on diametrically opposite sides of a rotating work piece that the cutting pressure of one tool will counteract that of the opposed tool and thereby facilitate the cutting of light work within the full capacities of each tool without springing or distorting the work. Oftentimes the work supporting centers are incapable of providing sufficient work support when taking a heavy cut but it has been found that by placing the tools on opposite sides of the work their cutting pressure counteracts one another and no undue or excessive pressures are exerted against the work supporting centers. I have also found it advantageous to so shape the noses of my cutting tools that all of the tools and the work may be relatively reciprocated longitudinally of the work so that the tools will continuously cut the work when traversed in both directions.

The rate of relative reciprocation must of course be directly dependent upon the type of work being turned as well as upon the nature of the cutting tool utilized, but an important feature of my invention lies in the fact that the cutting tools must move along the surface of the work at a very high rate of speed which is far in excess of that heretofore contemplated for use in lathes where a deep and heavy cut has been taken. It will therefore be noted that in accordance with my invention I employ the speed of the cutting operation and not the depth of cut to accomplish a rapid removal of stock and by this method I find I am best able to utilize the full cutting ability of the hardest of the abrasive type as well as the toughest modern high speed cutting tools.

In accordance with my method for rapidly turning and grinding rotating work to the exact required size and finish as illustrated diagrammatically in Figs. 1 and 2 of the drawing, I provide as a first step, a method of turning the work in a high speed lathe wherein is used a high speed cutting tool such as a tool formed of tungsten carbide granules cemented together by cobalt and commonly known by the trade name "Carboloy". I preferably employ a multiplicity of such tools 1, 2, 3 and 4, as shown in Fig. 1 and cause them to simultaneously take a series of adjacent shallow cuts under a light pressure in the surface of a rapidly rotating work piece 5, while the tools and work are reciprocated at an extremely rapid rate relative to each other and parallel to the work axis of rotation. As shown in the drawing, the work, which may be suitably supported and rotatably driven, is assumed to be rotated in the direction of the arrow $a$. The tools 1 and 2 are mounted in a traversable support 6 and the tools 3 and 4 mounted in the traversable support 7.

The supports 6 and 7 are arranged to be simultaneously reciprocated parallel with the work axis of rotation. By using a multiplicity of tools and mounting them in spaced relation upon diametrically opposite sides of the work on the tool supports 6 and 7 and preferably in staggered relation, I may take a series of shallow adjacent cuts with each reciprocatory stroke as shown in Fig. 1 wherein the tools are all simultaneously travelling in the direction as indicated by the arrow $b$.

The work is rotated very rapidly as compared with the usual lathe speed operated in accordance with standard practice, and the rate of longitudinal tool traverse during the reciprocatory movement, which may be accomplished by any suitable mechanism, is preferably so coordinated with the work rotation that the adjacent paths cut by the individual tools are close to each other but are separated by ridges of unremoved material. During the reversal of the tool traverse, the tools may be simultaneously fed into the work by a small amount. In this manner I have found it practicable to utilize the cutting ability of each tool to its fullest extent whereby the entire work piece may be reduced in size by a continuous cutting operation without any attempt at creating a smooth finished surface.

I preferably use round nosed cutting tools and cut a series of adjacent shallow grooves 8 separated from each other by ridges or raised uncut portions of stock 9 as shown in exaggerated form in the drawing to better disclose my method of rapid work reduction. When the work has been reduced to nearly the correct diameter, it is subjected to a grinding operation. This is accomplished as shown diagrammatically in Fig. 2 wherein a grinding wheel 10 is caused to successively engage the ridges 9 upon the work surface during a relative reciprocation between the wheel and the rotating work piece parallel to the work axis, which may be accomplished by any suitable mechanism. The wheel 10 is reciprocated over the work surface until the ridges 9 are ground away and the wheel has cut below the bottoms of the lathe tool grooves and formed the final cylindrical surface of the required finish and size.

I have therefore found that by my method of stock removal, I can rapidly reduce a work piece to the exact desired cylindrical size and finish in less time than needed to accomplish the same results by any former well known finishing method.

This case is a division of my copending application Serial No. 432,224, filed February 28, 1930.

Having thus described the invention, what is claimed as new and desired to secure by Letters Patent is:

1. The method of producing a round work piece comprising the steps of rapidly rotating the work, cutting its surface with a series of lathe tools while reciprocating the tools and the work relatively and longitudinally of the work at a rapid rate in such timed relation with the work rotation that the tools will be caused to cut a series of shallow adjacent paths separated by portions of unremoved material and then grinding away said material to form a smooth cylindrical surface of a desired finish and size.

2. The method of producing a cylindrical surface on a work piece comprising the steps of rotating the work piece and taking a series of adjacent cuts at a rapid rate while reciprocating the work and tool longitudinally of the work at a rate which has no reference to the roughness of the surface produced thereby and thereafter grinding the work to remove the lathe tool marks and thus produce a desired finish on the work surface.

3. The method of rapidly producing a round work piece comprising the steps of rapidly rotating the work while simultaneously cutting it with a high speed cutting tool, reciprocating the tool rapidly and causing it to cut the work in both directions at a rate which is capable of removing the maximum amount of stock without reference to the roughness of the surface thereby produced, and feeding the tool into the work in such manner as to cause it to take a shallow cut under a light pressure, and thereafter grinding the peripheral surface of the work to produce the desired size and finish.

4. The method of producing a round work piece comprising the steps of rapidly rotating the work, cutting its surface with a series of lathe tools diametrically opposed upon opposite sides of the work while reciprocating the tools and work relatively parallel to the work axis at a rapid rate and in timed relation with the work rotation whereby the tool will be caused to cut a series of adjacent shallow paths in the work separated by high portions of uncut material and thereafter progressively grinding the high portions of the work until the work has been ground below the bottoms of said paths and thereby producing a cylindrical surface of a desired size and finish.

5. The method of machining a rotary work surface comprising the steps of rotating the work at a rapid rate, reciprocating a high speed cutting tool and the work relatively at a high rate of speed while causing the tool nose to take a series of cuts under a very light pressure as it traverses repeatedly across the work surface, and feeding the tool into the work at the end of a reciprocatory stroke so that it will press against the work lightly and take only a shallow cut.

6. The method of turning an article and removing stock from its surface comprising the steps of rotating the work rapidly and cutting it with a multiplicity of high speed cutting tools which take a succession of shallow cuts under a very light pressure as compared with the pressure limit of the tool when cutting at slow speed, and reciprocating the tool and work relatively at a rapid rate without attempting to produce a smooth surface.

CHARLES H. NORTON.